Feb. 9, 1937. B. G. EATON, JR., ET AL 2,070,006
WING SPOILER
Filed July 19, 1934   3 Sheets-Sheet 1
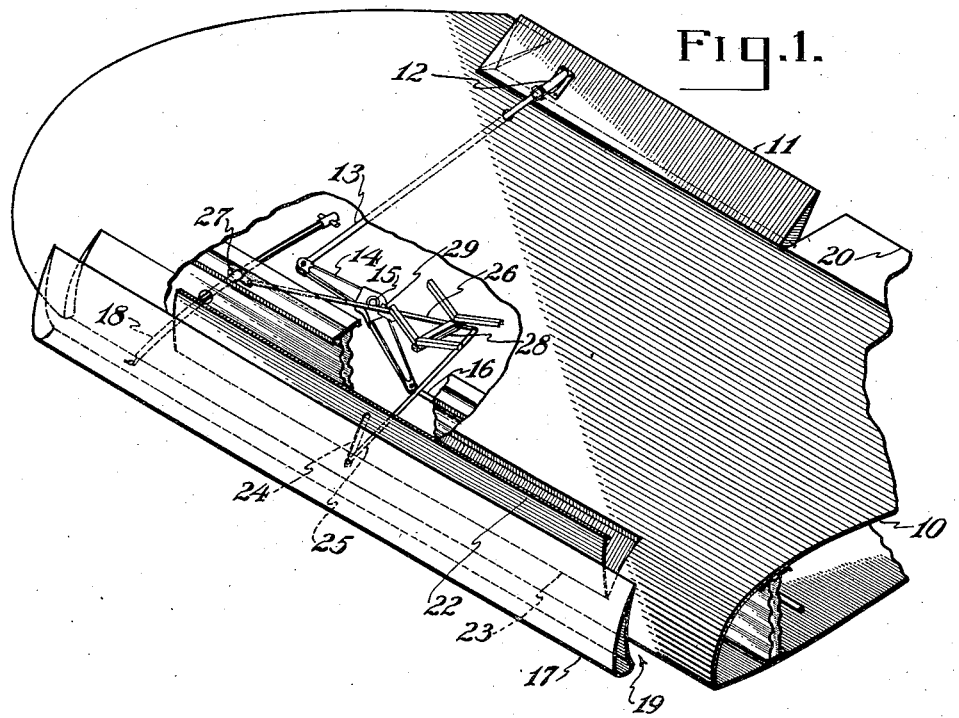
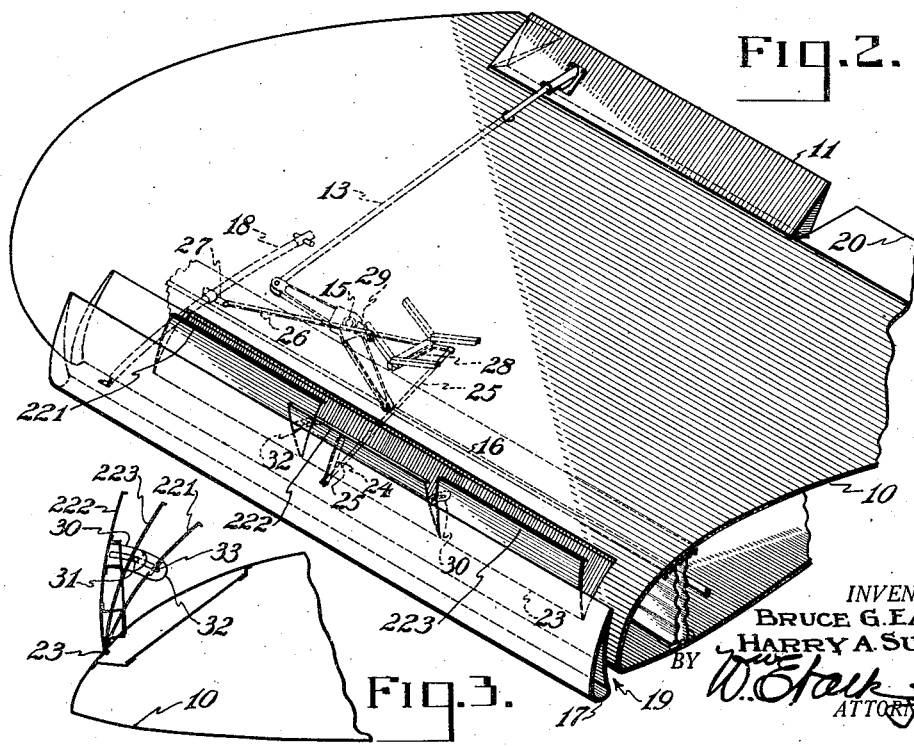
INVENTORS.
BRUCE G. EATON JR.
HARRY A. SUTTON
BY
ATTORNEYS.

Feb. 9, 1937.  B. G. EATON, JR., ET AL  2,070,006
WING SPOILER
Filed July 19, 1934   3 Sheets-Sheet 2
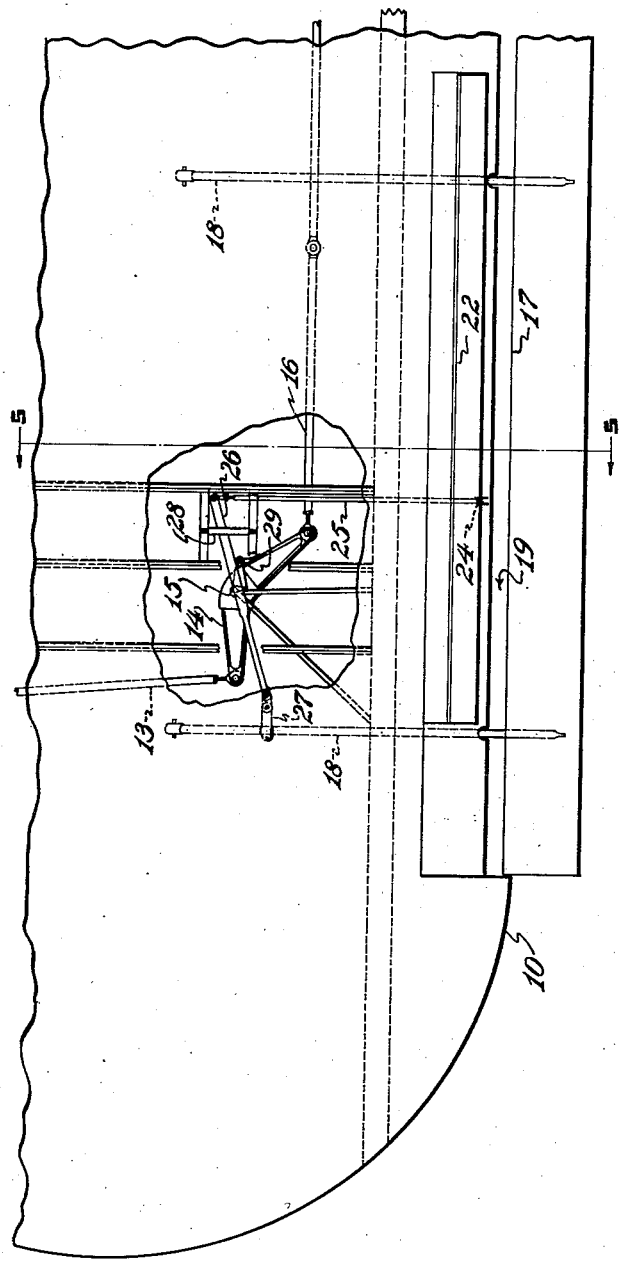
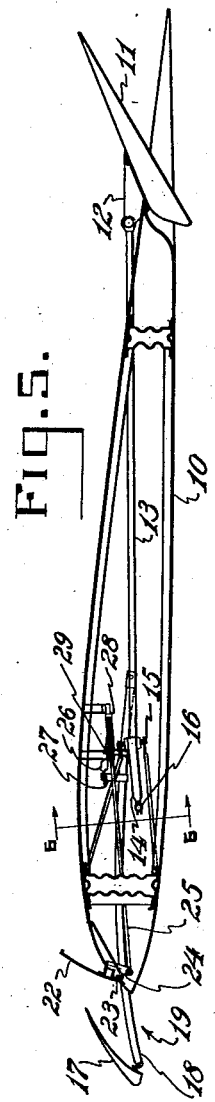
INVENTORS
BRUCE G. EATON, Jr.
HARRY A. SUTTON.
BY
ATTORNEYS.

Feb. 9, 1937. B. G. EATON, JR., ET AL 2,070,006
WING SPOILER
Filed July 19, 1934 3 Sheets-Sheet 3

INVENTORS.
BRUCE G. EATON JR
HARRY A. SUTTON.
BY
ATTORNEYS.

Patented Feb. 9, 1937

2,070,006

UNITED STATES PATENT OFFICE 2,070,006

WING SPOILER

Bruce G. Eaton, Jr., and Harry A. Sutton, Buffalo, N. Y., assignors, by mesne assignments, to Curtiss-Wright Corporation, a corporation of New York Application July 19, 1934, Serial No. 735,992

8 Claims. (Cl. 244—90)

This invention relates to aircraft, and is particularly concerned with control systems thereof.

In lateral control of aircraft, ailerons are normally used, these being adequate in normal flight, but their control effectiveness becomes low when the aircraft approaches or reaches a stalling attitude. Normal ailerons become even less effective when the aircraft wings are equipped with lift increasing devices, such as flaps and slot forming leading edge airfoils, which allow the wing to maintain lift without burble at substantially higher angles of attack than are otherwise possible.

To obtain adequate lateral control under the high angle of attack conditions various devices have been proposed, including lift spoilers which may be operated either alone or in conjunction with ailerons. The spoilers usually comprise blades or slats normally nested within the wing and having a substantial span with respect to the wing. These may be projected above the wing surface to spoil the air flow over the wing and thus locally reduce the lift thereof. The spoilers are operated alternately on the opposite wings.

In attempting to apply the spoiler system of lateral control to an aircraft it has been found that the spoiler action is non-uniform—that is, the degree of lift spoiling is not proportional to the distance they may be projected above the wing. This results in a tendency to over-control, since if the spoiler is moved through one unit of projection, little effect is produced upon lift or drag, if the spoiler is moved through the next unit of projection, a great effect is produced on lift and/or drag, and if the spoiler is moved through still another unit of projection, the additional effect on lift and/or drag may be either great or small.

The above disadvantages are largely overcome by our invention, which consists in organizing the spoiler system to produce a uniform lift spoilage effect in harmony with the degree of movement of the control element. In one embodiment, the spoiler comprises a plurality of short span spoiler sections arranged end to end, and mechanism is provided to bring first one, then another, and then another section into the air stream in response to continued operation of the control element. Thus, the spoilage effect of one section is limited to a small part of the wing span and has a less critical effect on the total air flow over the wing; the action of the several sections is so harmonized as to produce a uniformly increasing lift spoilage with uniformly increasing movement of the control element. A second embodiment of the invention comprises a unit spoiler of tapered plan form, the chord lengths of the spoiler thus being different along the spoiler span. As the spoiler is raised into the air stream, those portions having the longest chord first pass the critical range where effective spoilage occurs. As the spoiler is further projected, the span of that portion of the spoiler which has been projected beyond the critical range gradually and uniformly increases, thus uniformly spoiling the lift over an increasingly large part of the wing surface.

We include in this invention means for coordinating the operation of a spoiler for lateral control with an aileron, and also with a slot-forming auxiliary airfoil. Mechanism is provided for allowing the spoilers to be projected along with movement of the aileron above its neutral plane, so long as the slot-forming airfoil is extended. When the auxiliary airfoil is in a slot-closing position, however, the means for projecting the spoiler is rendered inactive, since effective lateral control in the normal flight attitude wherein the slot is closed is adequately accomplished by the aileron alone.

Objects of the invention are to provide an improved spoiler organization; to provide a spoiler having uniformly increasing effectiveness as the spoiler is projected, to provide a spoiler of tapered plan form, to provide a spoiler comprising a plurality of span sections connected for harmonious operation with each other, to provide a novel control means for a spoiler and to provide a mechanism for coordinating the operation of ailerons, spoilers and slot-forming airfoils.

For other objects, and for an understanding o fthe details of the invention, reference may be made to the annexed specification and claims and to the drawings, in which similar numbers indicate similar parts, and in which:

Fig. 1 is a fragmentary perspective view of a wing having an aileron, an auxiliary airfoil and a spoiler;

Fig. 2 is a view similar to Fig. 1 having sectional spoilers according to this invention;

Fig. 3 is a cross section through a portion of the wing leading edge showing the sectional spoilers in active position;

Fig. 4 is a plan of a wing portion showing the spoiler and aileron operating mechanism;

Fig. 5 is a section on the line 5—5 of Fig. 4;

Figure 6:
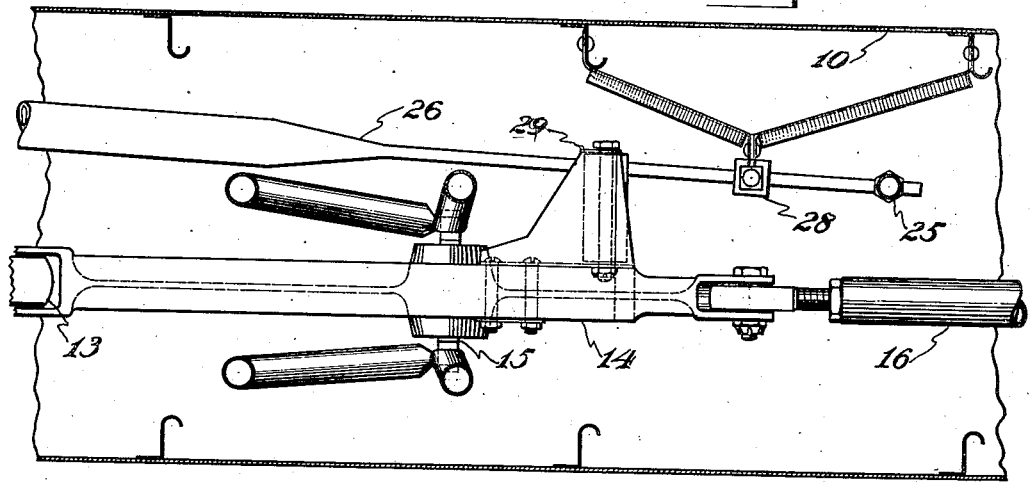
Fig. 6 is an enlarged section on the line 6—6 of Fig. 5.

A wing 10 is provided with a normal aileron 11 having a horn 12 and push rod 13 connecting to a bell crank 14 pivoted to the wing structure at 15. The aileron is controlled by a push-pull rod 16 extending between the bell crank 14 and the normal control stick, not shown. At the wing leading edge, a slot-forming auxiliary airfoil 17 is carried by rods 18 slidably mounted in the wing, the mounting, in well-known manner, permitting automatic extension of the airfoil 17 in high angle of attack conditions to form a slot 19. The slot controls air flow over the upper wing surface to enable lift to be maintained at higher angles of attack than would otherwise be possible. Preferably the airfoil 17 is coextensive with the wing span. A trailing edge flap 20 may be organized for downward swinging on the wing 10, for further increment of potential effective wing angle of attack.

Referring to Fig. 1, a spoiler 22 is hinged to the wing leading edge at 23, the hinge line 23 being within the arc of embracement of the airfoil 17 when the latter is closed. When open, however, the airfoil 17 permits forward and upward swinging of the spoiler 22 to close a portion of the slot 19 equivalent to the spoiler span. The spoiler carries an arm 24 depending below the spoiler hinge axis 23, a rod 25 pivoted to said arm extending rearwardly to be pivoted to a member 26. This member extends transversely to a pivot fitting 27 on one of the auxiliary airfoil holding arms 18. This fitting 27 forms a movable center about which the member 26 may swing upon operation of the spoiler. A guideway 28 carried by the wing structure, holds the member 26 for such swinging in a plane substantially parallel to the plane of the wing 10. The bell crank 14 carries an upstanding abutment 29 which may bear upon the forward side of the member 26.

The elements above described are proportioned and organized to function as follows:—When the airfoil 17 is extended to form the slot 19, assuming the aileron in neutral position, the fitting 27 is moved forwardly carrying the member 26 into contact with the abutment 29. Thereupon, if the aileron is moved down by rocking the bell crank counter-clockwise, the abutment is moved away from the member 26, not moving the latter. If the aileron is moved up, the bell crank is moved clockwise, causing the abutment 29 to bear on the member 26 and move it rearwardly, swinging on the fitting 27. This tensions the rod 25 and swings the spoiler 22 forwardly and upwardly on its hinge 23, to close the slot 19 in a degree proportional to the raising of the aileron.

If the slot 19 is closed, the fitting 27 is moved rearwardly, holding the member 26 out of contact with the abutment 29 regardless of the up or down aileron movement, whereby the spoiler is always inactive when the slot 19 is closed.

As previously indicated, the degree of lift spoilage effected by the spoiler 22, whether it operates in the slot 19 or whether it operates without being combined with an auxiliary slot-forming airfoil, is disproportionate to the degree of extension of the spoiler above the wing, assuming that the spoiler is of substantially rectangular plan form as in Fig. 1. For instance, if the spoiler is swung 30° from its retracted position, there is relatively little effect on wing lift or drag. Thereafter, up to a maximum spoiler displacement of 60°, the spoilage increases to a maximum. Obviously, the concentration of the spoilage effect over such a narrow range of movement, if a single rectangular spoiler were used, would make control extremely sensitive.

So, to distribute the spoiler effectiveness over a wider range, the spoiler may be made in a plurality of independently swingable tandem sections 221, 222 and 223, as shown in Figs. 2 and 3, all hinged along the same axis 23. One section, 222 as shown, is provided with the spoiler control system involving the arm 24 and rod 25. One end of the section 222 is provided with an arcuately slotted fitting 30 within the slot of which a pin 31, carried at the adjacent end of the section 223, slidingly engages. The slot of this fitting may embrace a relatively short arc, such as 15°. The opposite end of the section 222 carries a fitting 32 similar to the fitting 30 but having a slot embracing a greater arc, such as 30°. A pin 33 on the section 221 engages in this longer slot. When the main section 222 is raised, the sections 221 and 223 will not be moved at first. After movement of the fitting 30 to the point where the pin 31 reaches the end of the slot, the section 223 will be raised, and similarly, further movement of the section 222 will pick up and move the section 221. This construction permits of a gradually effective spoiler system wherein a single comparatively short spoiler section traveling through its critical range of movement will have an effect on lift spoilage over a relatively short part of the wing span. As the successive spoiler sections are moved into their critical range, spoilage of lift over a greater part of the wing span will accrue to give the maximum control effectiveness that may be needed. Obviously, there may be a greater or lesser number of spoiler sections. The angles at which successive spoilers will start to move may be varied, and the structure involved in successive movement of the spoiler sections may also be varied. The aggregate of the spans of the various spoiler sections may be coextensive with, or may be greater or less than the span of the aileron, and it is quite conceivable that they may be used independently of the conventional aileron system.

Figure 7:
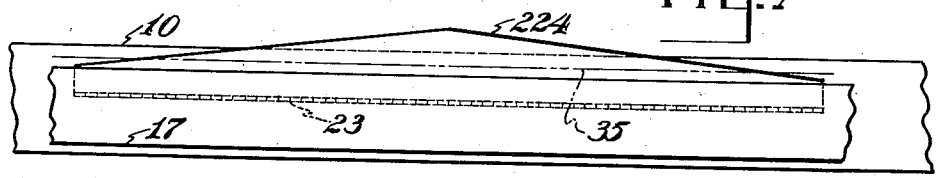
Figs. 7, 8 and 9 are front wing elevations showing various modifications of spoilers of tapered plan form.
Figure 8:
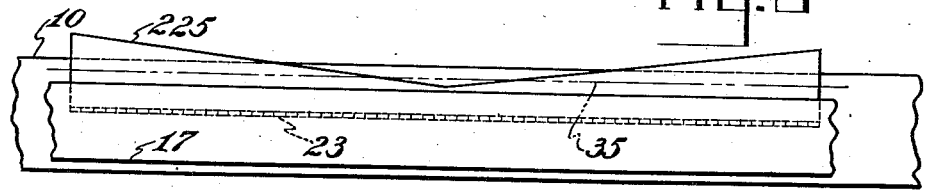
Figure 9:
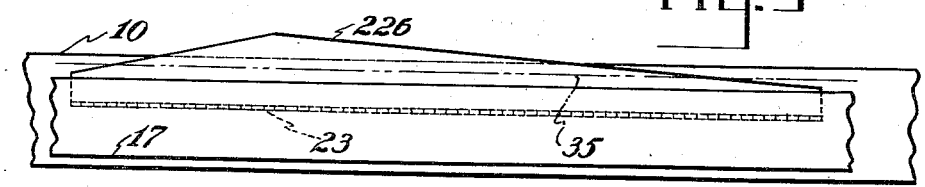

Figs. 7, 8 and 9 show alternative forms of single spoilers 224, 225 and 226, respectively, these being tapered in plan form. The actual form of the spoilers shown is different, but the principle underlying their operation is believed to be the same. Fig. 7 shows a spoiler wherein the maximum chord is in the center of the spoiler span and the minimum chord at the ends. In Fig. 8, the minimum spoiler chord is in the middle and the maximum chord at the ends, while in Fig. 9, the minimum chord is at the ends and the maximum is closer to one end than to the other. In these figures, the line 35 may be assumed to be the point below which the spoiler has relatively little lift spoiling effect, and above which the spoiler has a suddenly increasing lift spoiling effect. As the spoiler is raised so that the maximum chord portions of the spoiler are above the line 35, the lift of the wing immediately rearward of that spoiler portion will be affected. Further raising of the spoiler presents a wider spanned spoiler portion above the line 35 to cumulatively affect the wing lift rearward thereof. When the spoiler is raised to its maximum height, the whole spoiler will fully affect the wing lift. Thus, a gradual lift spoilage accrues in spite of the normal spoiler characteristic of uneven effect on lift as previously outlined. Raising of the spoilers 224, 225 and 226 may be accomplished by the same means shown in the other figures, or other suitable mechanism may be used.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

What is claimed is:

1. A spoiler system on each side of the aircraft axis of symmetry of an aircraft wing comprising relatively flat slats arranged end to end and each extendible from a nested position within said wing to a raised position outside the normal wing profile, and common means for raising first one and then another of said slats to active raised position from their respective nested positions.

2. In an aircraft wing, a spoiler system hinged adjacent the leading edge thereof, and means for tilting said spoiler system upwardly and forwardly relative to said wing, said spoiler system having a plan form such that certain portions thereof have a greater chord than other portions thereof by which the height of said spoiler system above the wing surface varies through the several spoiler portions when said system is tilted relative to said wing.

3. In an aircraft wing, a spoiler adjacent the leading edge thereof comprising a plurality of separate slats arranged end to end, means for raising one said slat from a position adjacent the wing covering to an elevated position above the wing, and connections between said one slat and the other slats for progressively raising said other slats above the wing after raising of said one slat has been initiated.

4. In an aircraft wing panel, at one side of the aircraft symmetry axis, a spoiler comprising a plurality of separate slats each hinged to said wing for movement from a position adjacent the wing covering to an elevated position above the wing, means for so elevating one said slat, and lost motion connections between said one slat and the other slats whereby said other slats will lie adjacent the wing until said one slat has been raised a predetermined distance from said wing, whereafter, on continued motion of said means, said other slats are raised to lift spoiling position.

5. In an aircraft wing, in combination, an aileron, means for operating said aileron, a plurality of spoiler slats carried on said wing and means interconnecting said slats with said aileron for successively raising said slats above said wing as said aileron is progressively raised.

6. In an aircraft wing, in combination, a trailing edge aileron, a slot forming leading edge airfoil, a plurality of spoiler slats each of lesser span than said airfoil arranged end to end, each being organized for movement from a position substantially flush with the wing surface toward a position for closing that portion of said slot coextensive with the slat, and means for moving first one and then another said slat toward a slot closing position upon cumulatively greater upward movement of said aileron.

7. In an aircraft wing, in combination, a trailing edge aileron, a plurality of spoiler slats in end to end relationship along the forward part of said wing, each said slat being movable from a position substantially flush with the wing to a lift spoiling position thereabove, and means responsive to increasing upward movement of said aileron for raising one and then another of said slats, consecutively, above said wing surface.

8. In a wing spoiler system, a plurality of tandem spoiler slats along the wing leading edge on each side of the aircraft axis of symmetry, each slat being mounted for movement between an inactive position flush with the wing and an active lift spoiling position above the wing leading edge, an operating device, and means responsive to continued device operation to consecutively raise first, one slat to lift spoiling position while another slat is inactive, then to raise another slat from inactive to active position while the said one slat remains in active position.

BRUCE G. EATON, Jr.
HARRY A. SUTTON.